Sept. 29, 1970   F. J. SMITH   3,530,988
MEANS FOR PREVENTING CONTAMINATION OF TREATED LIQUIDS
Filed March 14, 1969   5 Sheets-Sheet 3

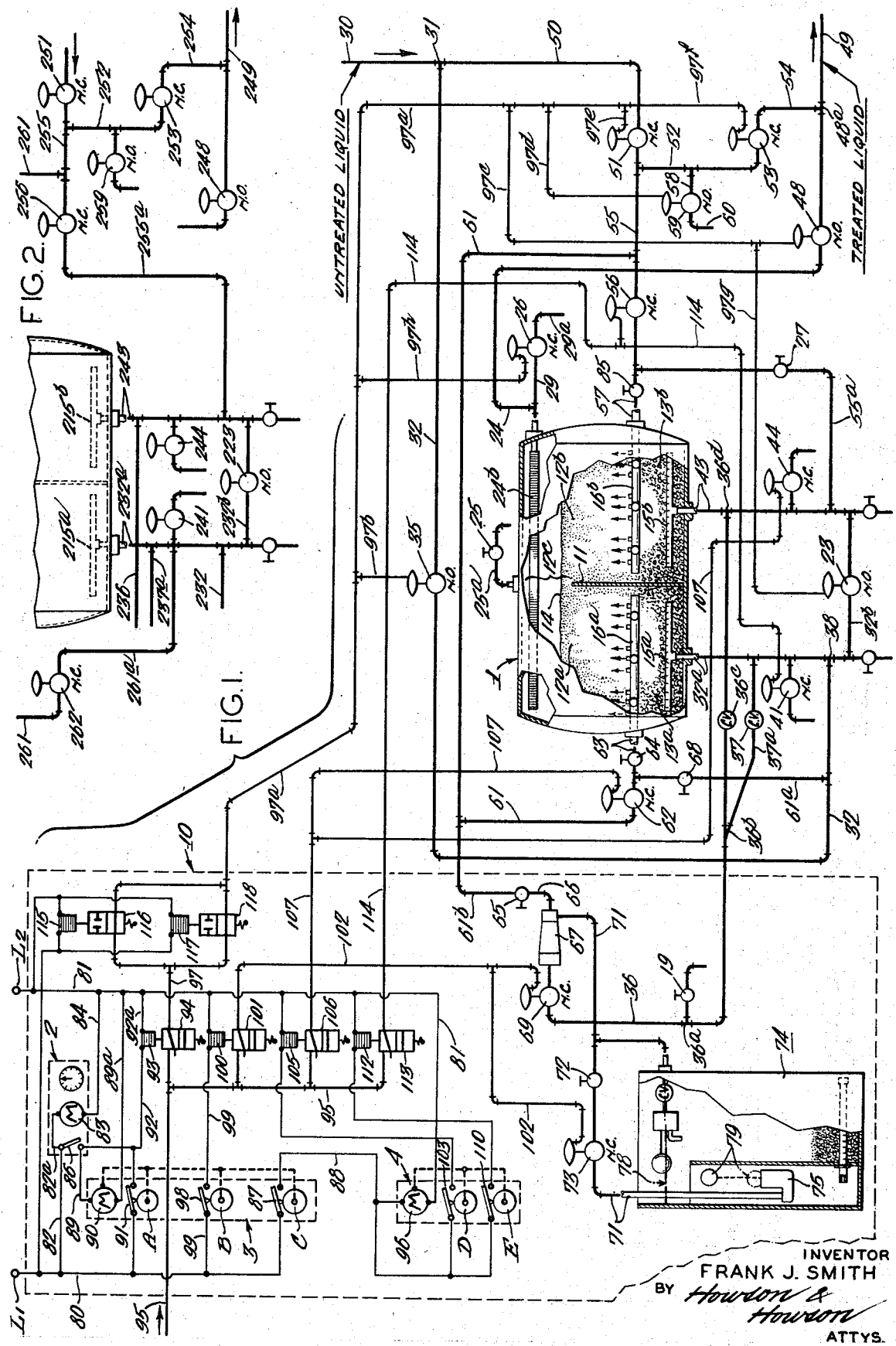

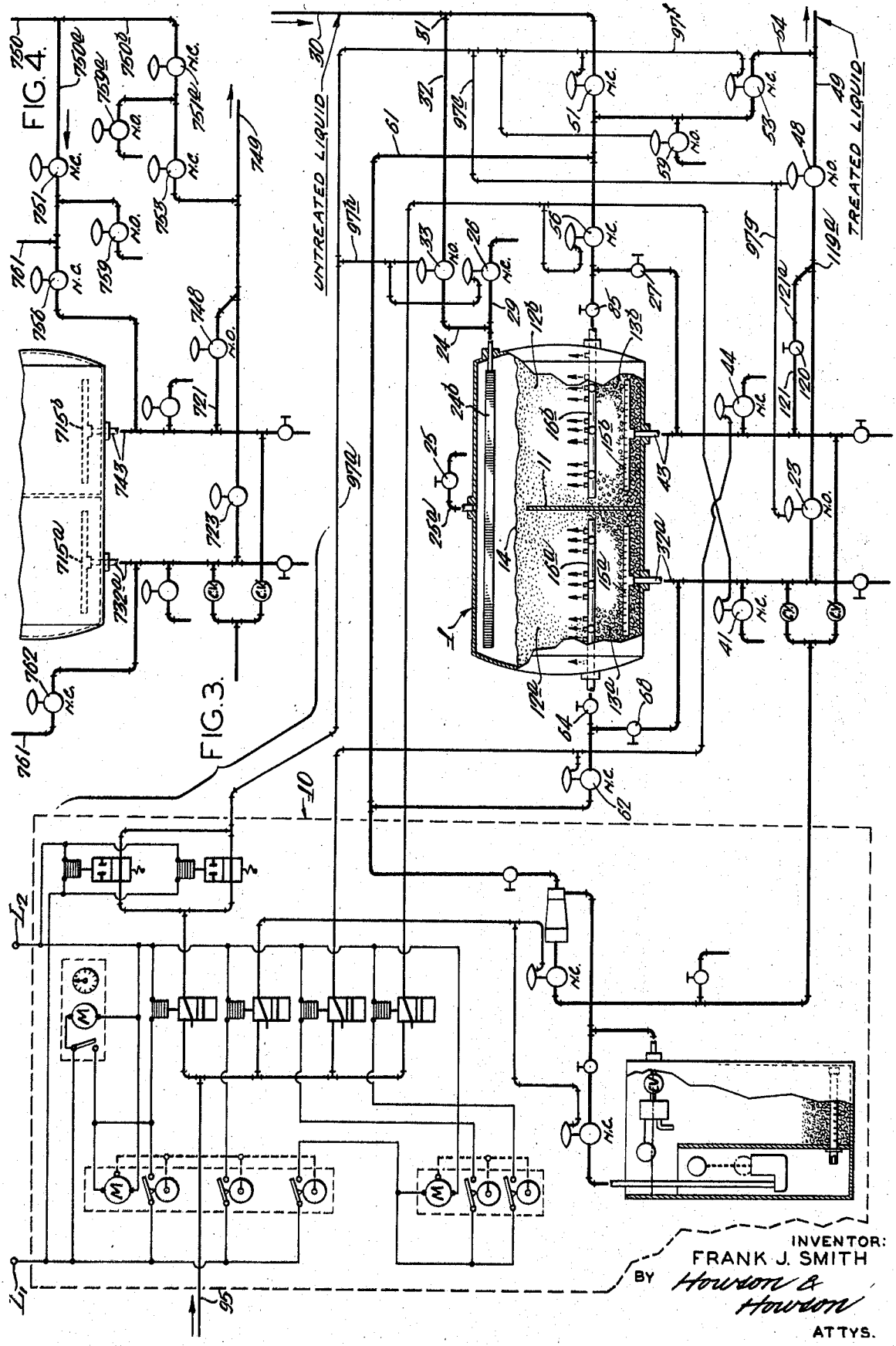

VALVES 23 & 48 (Normally Open)

VALVES 35, 59 & or 33 (Normally Open)

VALVES 26-44 & 56 (Normally Closed)

VALVES 41-51-53-62-69 & 73 (Normally Closed)

INVENTOR:
FRANK J. SMITH
BY
Howson & Howson
ATTYS.

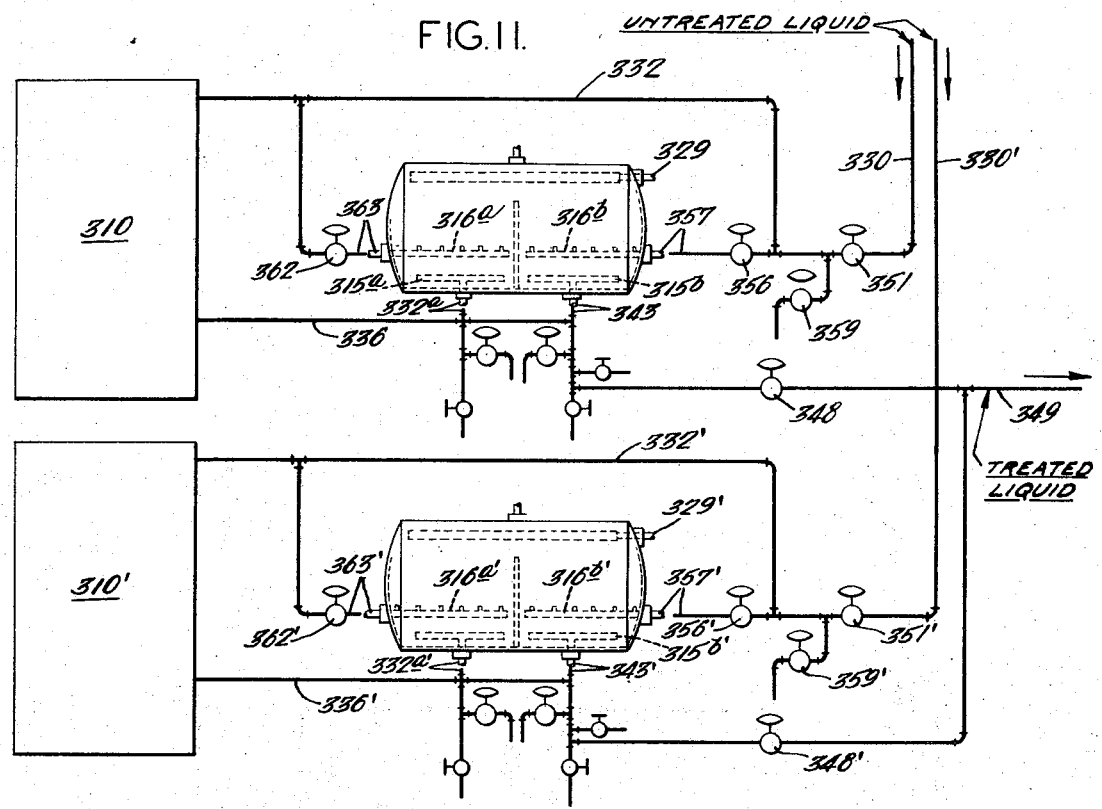
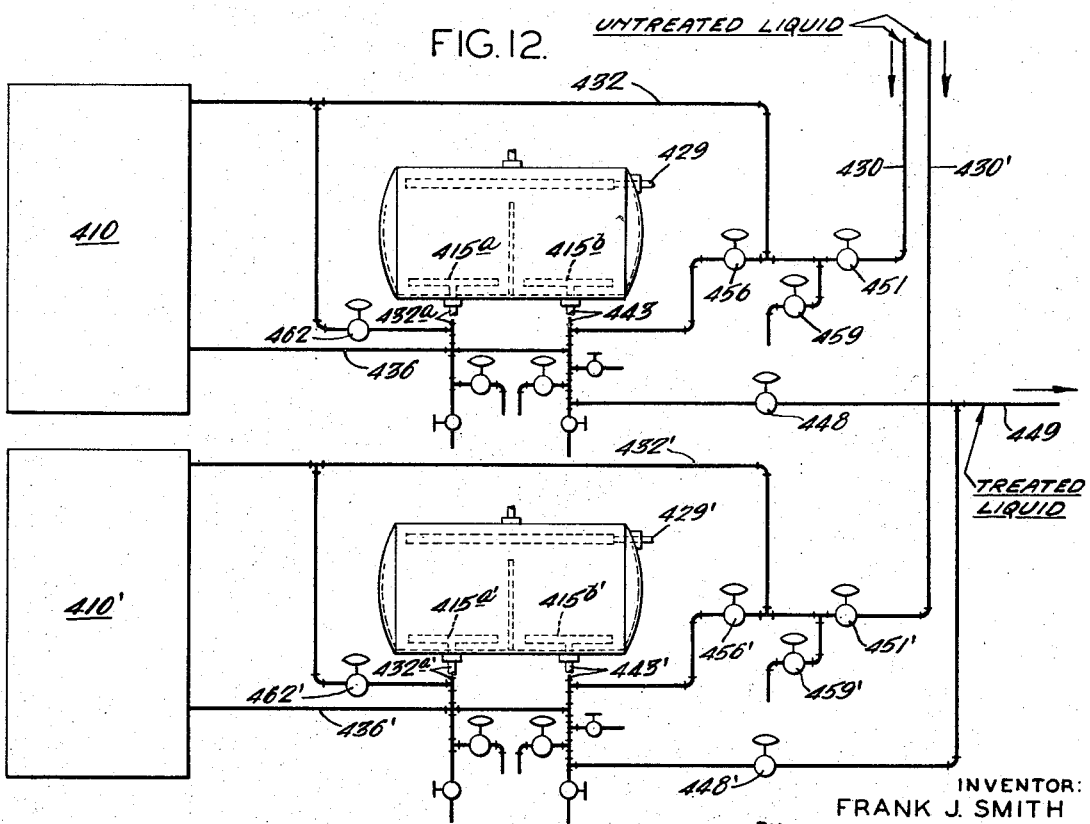

FIG. 13

United States Patent Office 3,530,988
Patented Sept. 29, 1970

3,530,988
MEANS FOR PREVENTING CONTAMINATION OF TREATED LIQUIDS
Frank J. Smith, 7352 Limekiln Pike, Philadelphia, Pa. 19138
Filed Mar. 14, 1969, Ser. No. 807,392
Int. Cl. B01d 29/08
U.S. Cl. 210—130                                    11 Claims

ABSTRACT OF THE DISCLOSURE

For liquid treating apparatus having an untreated backwash liquid conduit leading into the apparatus connected by an untreated liquid by-pass conduit to a treated liquid conduit leading from the apparatus, the improvement to prevent passage of contaminating leakage into either the backwash conduit or the by-pass conduit, said improvement including spaced normally closed valves in the conduits and means for venting the conduits between said valves in the conduits to prevent pressure buildup with resultant flow of contaminant into treated liquid.

---

The present invention relates generally to liquid treating apparatus such as the ion exchange equipment used in water treatment. In particular, the present invention relates to apparatus for preventing contamination of the treated liquid by leakage of untreated liquid into the treated liquid regions of the apparatus or treated liquid conduits.

The invention is presented below in the setting of water treating ion exchange equipment although it should be understood that the invention is applicable to any liquid treating system in which conduit means are provided for alternately introducing an untreated liquid into different regions of the system or for by-passing the apparatus entirely and wherein leakage through the alternate or by-pass conduits must be prevented to prevent contamination of the treated liquid.

Ion exchange equipment for water treatment conventionally includes a container supporting a bed of particulate material such as zeolite resin beads which are saturated with desirable ions. When untreated water bearing undesirable ions is passed through the bed of particulate materials, the desirable ions on the beads are exchanged for the undesirable ions in the water, the undesirable ions being attracted to and held by the beads while the desirable ions are released into the stream of water. When the resin beads approach exhaustion of their desirable ions during the service or exhaustion flow of the liquid, the reverse capability of the resin beads for ion exchange is utilized by terminating the service or exhaustion flow, washing the resin beads of accumulated dirt and film (backwash), and recharging the beads by passing a strong regenerating solution of desirable ions through the bed. After the beads, following a period of flow of regenerating solution, approach saturation of desirable ions, the regenerating solution flow is discontinued and the excess regenerating solution rinsed away. Upon conclusion of the rinse operation, the beads are again ready for the service or exhaustion flow.

In an installation which comprises a single treating system, it is necessary during the regeneration phase of the cycle to by-pass untreated liquid directly to the treated liquid conduit if a supply of liquid is required during this period. It is evident that unless passage of untreated liquid through this by-pass conduit can be prevented during the normal exhaustion flow of treated liquid, contamination of the treated liquid can occur.

The backwash of the beads is normally accomplished by passing untreated liquid under substantial pressure into the container, preferably in a cyclical manner to create a turbulent flow through the beads. In systems characterized by downflow exhaustion wherein the direction of exhaustion flow is from the top to the bottom of the bed of beads, the treated liquid is piped from the bottom of the container. However, the backwash is normally initiated from the bottom of the container by introduction of untreated liquid, and it can hence be understood that any leakage during the exhaustion flow of untreated liquid through the backwash conduits could result in a contamination of the treated liquid leaving the container.

The present invention provides a positive elimination of leakage contamination of treated liquid by the infiltration of untreated liquid. This contamination, which exists in varying degrees in most installations of this type, is caused either by the prevention of complete closure of liquid flow valves by deposit of foreign materials adhering to the valve parts, or by the use of equipment having worn components. Although the economic loss due to untreated leakage when considered by itself is not of great importance, this contamination has far reaching effects, particularly in the field of high pressure boiler operation where the accumulation of scale deposits in the steam generating portions of the equipment reduces the efficiency of the unit, increases the potential failure of tubes and shell plates due to overheating and creates various unnecessary expense for repairs, replacements, and need for a periodic removal of the scale by mechanical or chemical methods.

To prevent passage of contaminating leakage through the by-pass or the backwash conduits, spaced valves are employed and means provided for venting the portion of the conduit between the valves to prevent leakage pressure buildup therewithin. This arrangement can be applied either to the by-pass conduit, backwash conduit, or in a system including both backwash and by-pass conduits, to the combined system to prevent any possibility of leakage contamination of the treated liquid.

It is accordingly a primary object of the present invention to provide improvements in a liquid treating system for the prevention of contamination leakage of untreated liquid into the treated liquid either through a by-pass conduit or through untreated liquid conduits leading into a treating liquid region of the apparatus.

A further object of the invention is to provide the improvements as described which is adapted for use with various types of liquid treating apparatus regardless of direction of exhaustion flow.

An additional object of the invention is to provide the improvements as described which can be economically applied to liquid treating systems including existing systems and which are particularly adapted for automatic control.

Additional objects and advantages of the invention will be more readily apparent from the following detailed descriptions of embodiments thereof when taken together with the accompanying drawings in which:

FIG. 1 is a schematic view showing a liquid treating apparatus of a fully automatic type embodying the present invention, the apparatus being of the single container dual chamber type characterized by upflow exhaustion and provided with backwashing jets;

FIG. 2 is a partial schematic view of a liquid treating system similar to that shown in FIG. 1 but without the backwashing jets;

FIG. 3 is a schematic view of a liquid treating apparatus similar to that shown in FIG. 1 but characterized by downflow exhaustion;

FIG. 4 is a partial schematic view of a system similar to that of FIG. 3 but without the backwashing jets and employing separate vent arrangements for the by-pass and backwashing conduits;

FIG. 11 is a schematic view showing the application of the invention to a liquid treating system employing a pair of dual chamber containers characterized by downflow exhaustion and having backwashing jets;

FIG. 12 is a view of apparatus similar to that shown in FIG. 11 but wherein the containers do not have backwashing jets; and FIG. 13 is a chart showing the sequence of valve openings during the various phases of the operating cycle of an upflow exhaustion unit of the type shown in FIG. 1.

Figure 5:
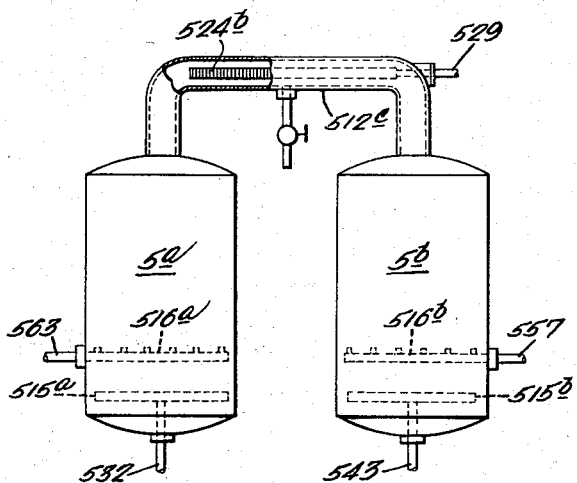
FIG. 5 is a schematic view showing only the container portion of a liquid treating system similar to that shown in FIG. 1 but wherein dual containers with backwash jets are employed instead of the single container having dual chambers.

Referring to the drawings and particularly FIG. 1 thereof, a liquid treating apparatus is illustrated including a single container 1 having a partition 11 extending from the bottom to a point near but below the top to provide two companion treating chambers 12a and 12b with a top passage 12c between them. Each chamber is provided in the bottom with a graduated bed 13a and 13b of particulate supporting material with the finest material at the top and coarsest material at the bottom. Located above the supporting bed there is provided a bed of ion exchange liquid treating material 14 extending up to a point above the top of the partition 11 and leaving a small open space thereabove. Immediately above the supporting beds and immediately beneath the treating beds, that is, between the beds, are provided multiple nozzle backwashing manifolds 16a and 16b respectively, with screened or finely slotted jets and diffusers arranged to create vigorous and turbulent flow upwardly.

Located in the lower portion of the particulate bed 13a is a liquid diffuser and collector 15a connected to pipe 32a, while in the lower portion of the particulate bed 13b is diffuser and collector 15b connected to pipe 43. These units 15a and 15b, having holes or slots for passage of liquids act as diffusers when liquid is flowing outwardly into the gravel particulate matter and act as collectors when the flow is reversed. Located in the top section of chambers 12a and 12b and above partition 11 is collector-diffuser strainer 24b connected to both pipe 24 and pipe 29. The spaces for passage of liquid and fine particles through 24b is roughly 50% of the size of the resin bead particles. Located on the top of tank 1 is pipe 25a with hand operated valve 25 for the venting of air or the draining of scum that might accumulate at the top of the tank that had not passed through the collector-diffuser strainer 24b.

Liquid treating apparatus of the above described type is shown in my copending application Ser. No. 693,341, filed Dec. 26, 1967, and now U.S. Pat. No. 3,441,503, wherein the manner of operation and particularly the function of the backwashing jets or nozzles is fully set forth. In the apparatus of that prior application, the liquid flow was manually controlled by a suitable valve arrangement while in the presently illustrated embodiments the controls are automatic. It should be understood that the control system presently shown is only representational and that the same results may be accomplished by manual, or semi-automatic operation; by the use of Stager systems manufactured by AquaMatic, Inc. of Rockford, Ill.; by controlled or uncontrolled use of direct acting solenoid valves; by the use of fluid amplifiers; or by different adaptations of diaphragm valves with two-way, three-way or four-way solenoid valves.

The controls of the automatic system shown in box 10 of FIG. 1 include: One 24 hour dial timer 2 with astronomical day omitting device, such as manufactured by Tork Time Controls, Inc. of Mount Vernon, N.Y.; two multi-circuit adjustable cam program controllers 3 and 4 such as manufactured by Automatic Timing and Controls, Inc. of King of Prussia, Pa., two two-way normally closed solenoid valves 116 and 118, and four three-way normally closed solenoid valves 94, 101, 106 and 113 such as manufactured by Automatic Switch Company of Florham Park, N.J.

Figure 13:
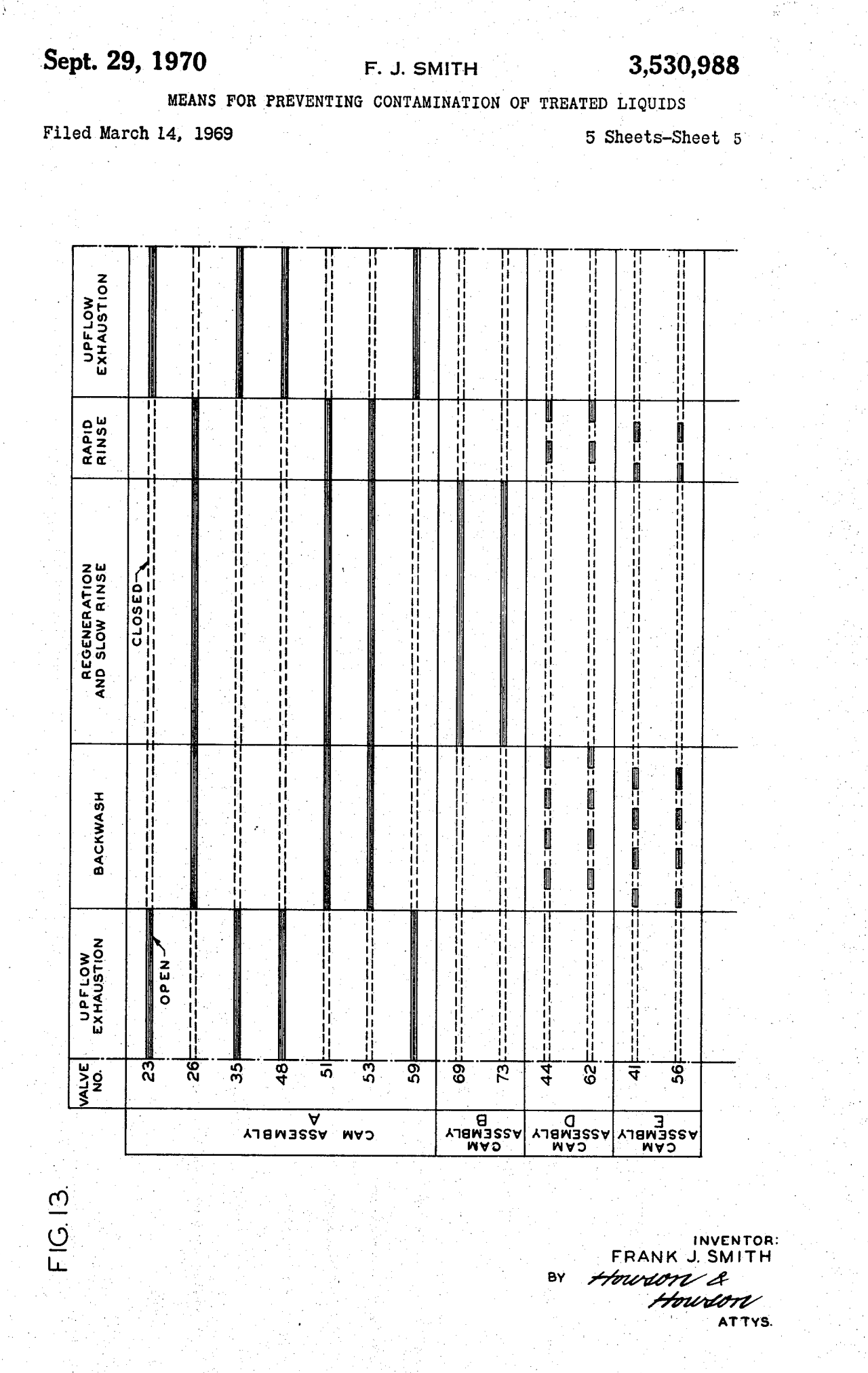

The timer 2 is a 24 hour time switch with an astronomical day omitting device driven by a synchronous motor with means to set pairs of ON-OFF trippers with limitations of 20 minute minimum operations, to provide the transfer of electrical current as desired. This control also provides a 7 spoke wheel marked with the days of the week and having a screw arrangement for omitting days when it is not desired to initiate any sequence of operations. Initiation may be selected for any time of the day or night, and for any day or days of the week. The multi-circuit adjustable cam program controllers have replaceable and adjustable cams with make and break finger switches, said cams being mounted on shafts that are rotated by gear drive powered by a synchronous motor, and are shaped to provide the appropriate electrical contact periods to effect a cyclical valve control as shown in FIG. 13 and as described in further detail below. The 24 hour time switch 86 of timer 2 is wired in series with cam controller motor 90 and in parallel with switch 91 of cam A of the primary controller 3. Both supply electric current to cam motor 90. Cam switch 91, acting as the stop switch of motor 90 since it is in service during the entire period of regeneration, maintains current to motor 90 after timer switch 86 opens, until regeneration is terminated by action of cam A.

In most industrial installations, the capacity of the ion exchange equipment is adequate to provide for more than a full day of operation in the exhaustion flow, and since the total time required for backwash, regeneration, and rinse is usually less than 10% of the total operational time, the selection of the solenoids and diaphragm valves is made in order that all controls and valves, except two-way valves 116 and 118 can be in the de-energized and operation position during the ion exchange exhaustion phase. This is a "fail safe" arrangement to insure that a power interruption can have no effect on the flow of treated liquid during the exhaustion operation except to postpone the next initiation of the regeneration cycle by the length of the power interruption. With no fluid pressure to any diaphragm control valve, the closing of solenoid valves 116 and 118 has no effect on the operation of the system. In the event of a power interruption during the backwash, regeneration, or rinse part of the cycle, the by-pass remains in service while the backwash, regeneration, or rinse operation is suspended for the duration of the power failure. This suspension is effected by blocking off the pressure to the diaphragm valves that provide liquid flow through the by-pass. When electric service is again supplied, the backwash, regeneration, or rinse portion is resumed at the point of interruption and carried to completion.

It is considered expedient for smooth continuity of description and for easy understanding of the relationship of the various components to describe the sequence of events during a complete cycle of the FIG. 1 apparatus in the following order: Exhaustion flow; operation of by-pass; arrangement to prevent contamination; backwash; regeneration and slow rinse; rapid rinse.

During the exhaustion portion of the cycle, since all electrical controls are de-energized with the exception of the two-way normally closed solenoid valves 116 and 118 whose coils 115 and 117 respectively are energized at all times except during a power failure, all fluid actuated diaphragm valves are in their normal positions. Untreated liquid is introduced into container 1 through untreated liquid conduit 30 from an external source, flows to and through fitting 31, passes through pipe 32, through normally open diaphragm valve 35, divides at fitting 38, one portion passing into and through diffuser 15a by way of pipe 32a and the other portion, after passing through normally open diaphragm valve 23, passes into and through diffuser 15b by way of pipe 43. Upward flow takes place simultaneously through beds 13a and 13b, through resin bed 14 in chambers 12a and 12b, the treated liquid now passing into and through collector 24b, pipe 24, through normally open diaphragm valve 48 to use by way of treated liquid conduit 49.

Since the system shown in FIG. 1 has only one conduit 49 for supplying treated liquid from the ion exchange beds, a by-pass piping arrangement is needed for the supply of untreated liquid as a substitute for treated liquid during the periods of backwashing, regenerating, and rinsing of the ion exchange material. The by-pass as shown, includes a fluid actuated diaphragm valve 53 connected to untreated liquid supply pipe 55 by by-pass conduit 52 and connected to liquid effluent pipe 49 by pipe 54. The unique installation position of this by-pass valve 53 is incorporated in the following description of the arrangement and operations of valves 51, 53, 56, 59 and 62 which group forms the design and means for the prevention of contamination of treater liquid by the infiltration of untreated liquid in systems having only one discharge pipe for flow of treated liquid effluent from a single treatment container.

Figure 7:
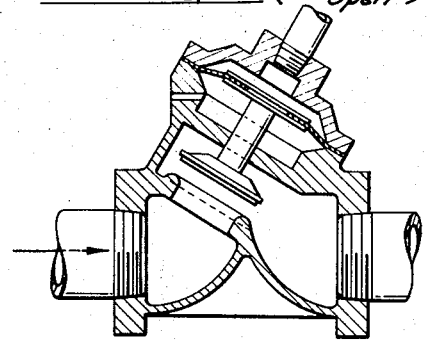
FIGS. 7–10 are sectional views showing the types of fluid pressure actuated fluid diaphragm valves utilized in the various embodiments of the invention illustrated.
Figure 8:
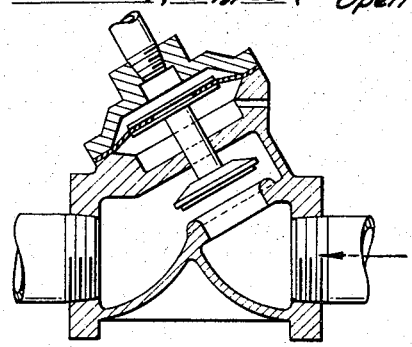
Figure 9:
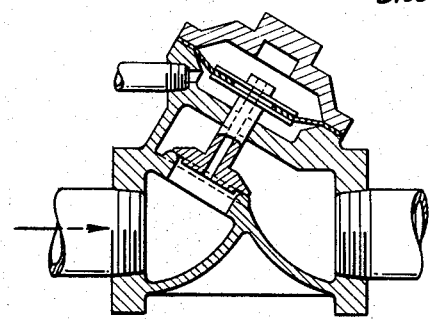
Figure 10:
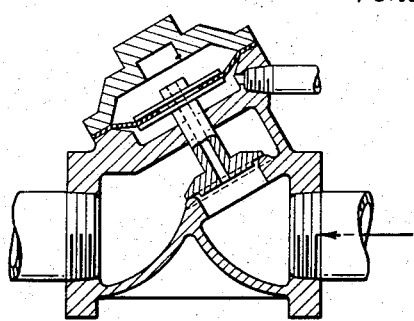

The pressure actuated diaphragm valves selected for the description of the controlled liquid flow in these systems are of two configurations; one being the standard normally open type as shown in FIGS. 7 and 8 in which the pressure of the liquid passing through the body of the valve raises the valve disc from the valve seat when there is no controlling pressure being applied to the upper chamber and therefore no pressure on the top of the diaphragm connected to the solid valve stem. Since the lower control chamber is vented at all times, the valve disc will become seated when sufficient fluid pressure is applied to the top control chamber and therefore to the top of the diaphragm, to overcome the pressure on the bottom of the valve disc. The other valve shown in FIGS. 9 and 10 is the standard normally closed type in which the pressure of the liquid passing through the body of the valve and also into the upper chamber by way of the hollow valve stem, exerts sufficient pressure on the top of the diaphragm connected to this hollow stem to close the valve when the lower control chamber is vented. This valve is opened by the application of sufficient fluid pressure to the lower control chamber, and therefore to the bottom of the diaphragm, to overcome the pressure being applied to keep the valve in the closed position.

The system shown in FIG. 1 to prevent infiltration of untreated liquid into treated liquid comprises five fluid pressure actuated diaphragm valves 51, 53, 56, 59 and 62. Valve 51 (FIG. 10) is a standard normally closed pressure actuated diaphragm valve, conventionally installed with the directional flow of untreated liquid from pipe 50 entering the opening in the valve body as designed, to close the valve when pressure on the upper side of the diaphragm exceeds that of the valve disc.

Valve 53 (FIG. 10) is a normally closed fluid pressure actuated diaphragm valve, installed, as mentioned in the previous description of the by-pass arrangement, by being connected to untreated liquid supply pipe 55 by pipe 52 and connected to treated liquid conduit 49 at junction fitting 48a by pipe 54. This installation is unusual and unconventional in that the normal position of the valve body is reversed: the normal entrance into the valve body progressing toward the bottom face of the disc and aligned with the hollow valve stem being connected to pipe 54 instead of being connected to pipe 52 as it would be done if installed conventionally to convey by-pass liquid from pipe 50, through valve 51, pipe 52, valve 53, pipe 54 to fitting 48a and pipe 49.

Valve 56 (FIG. 9) is a normally closed fluid pressure actuated diaphragm valve connected to the untreated liquid supply pipe 55 and jet backwash pipe 57. This installation is unusual and unconventional in that the normal position of the valve body is reversed: the normal entrance into the valve body progressing toward the bottom face of the disc and hollow valve stem being connected to pipe 57 instead of being connected to pipe 55 as would be done in a conventional installation.

Valve 62 (FIG. 10) is a normally closed fluid pressure actuated diaphragm valve connected to the untreated liquid supply pipe 61 and jet backwash pipe 63. This installation is unusual and unconventional in that the normal position of the valve body is reversed; the normal entrance into the valve body progressing toward the bottom face of the disc and hollow valve stem being connected to pipe 63 instead of being connected to pipe 61 as would be done in a conventional installation.

Valve 59 (FIG. 8) is a normally open fluid pressure actuated diaphragm valve connected conventionally to pipe 58 which in turn is connected to by-pass conduit 52. During the long periods of exhaustion flow, when all solenoids are deenergized and their valves are in the vented position, normally closed diaphragm valve 51 remains in the closed position as a result of the pressure from pipe 50; normally closed valve 53 remains closed by pressure from pipe 54; normally closed valve 56 remains closed by pressure from pipe 57, normally closed valve 62 remains closed by pressure from pipe 63 and normally open valve 59 is free to open if any liquid pressure develops in pipe 58. Therefore, no appreciable pressure can build up in pipes 55 and 52 and contamination infiltration from pipe 50 to pipe 57 or to pipe 54 cannot occur.

Any leakage from valves 51, 53, 56 or 62 would pass through pipe 58, through valve 59 and discharge from pipe 60 where early indication of leakage would be observed. It is to be noted that with valve 59 in the open position, and consequently no pressure in pipe 52 to valve 53, and likewise no pressure in pipe 55 to valve 56, and likewise no pressure in pipe 61 to valve 62, the normally closed valves 53, 56 and 63 could not function if installed in a conventional flow direction as there would be no actuating pressure applied to the bottom of the valve discs and consequently no pressure transmitted to the top of the diaphragms to close them or to keep them closed.

Considering the operation of the automatic cycling controls, electric current is supplied by power lines L1 and L2. This current is continuously supplied to the 24 hour dial time switch motor 83 connected to power line 80 by lines 82 and 82a and connected to power line 81 by line 84. At a selected time for regeneration to begin, time switch 86 closes to initiate operation of cam controller motor 90 driving cam switches 91, 98 and 87. It should be understood that this initiation may also be accomplished by the use of a manual switch, by a switch on a fluid meter, or by any other means desired. Current is now permitted to flow from 82, through 86 simultaneously to both cam program controller motor 90 by way of line 89 and to coil 93 of three-way solenoid valve 94 by way of line 92. Cam program controller motor 90 is connected to power line 81 by line 89a and solenoid valve coil 93 is connected to power line 81 by line 92a. After 1% of the total cam cycle operational time which is less than the 20 minute minimum operational contact time of switch 86, switch 91, operated by cam A closes, thereby maintaining operation of cam program controller motor for the full cycle of the controller. As shown, since solenoid valve coil 93 is energized simultaneously with cam controller motor 90, normally vented solenoid valve 94 now changes position permitting actuating fluid to flow from pipe 95, through valve 94, through pipe 97, through normally closed two-way solenoid valves 116 and 118, through pipes 97a–h to valves 23, 26, 35, 48, 51, 53 and 59 thereby reversing their positions. Normal exhaustion flow is terminated and untreated liquid is now supplied from pipe 50, through valve 51, down pipe 52 through by-pass valve 53, through pipe 54 to use through pipe 49 as a substitute for treated liquid until the regeneration portion of the cycle has been completed.

A brief interval after the closing of cam switch 91, the purpose of the delay being to permit the by-pass liquid flow through valve 53 to become stabilized, cam switch 87, actuated by cam C is closed. Electric current is now supplied by line 88 to motor 96 of program controller 4. As switch 103 of cam D closes, current is supplied to coil 105, actuating solenoid valve 106. Fluid pressure from source 95, passing through valve 106 and pipe 107 opens valves 62 and 44. Hand valve 64 is open, and under normal conditions hand valve 68 is closed. Untreated liquid now flows from pipe 50, through valve 51, pipe 55, pipe 61, through valve 62, through valve 64, to and through jet manifold 16a, flows rapidly upwardly in chamber 12a lifting the relatively light resin beads of 12a in a vigorous turbulent flow that carries the resin beads through passageway 12c where some of the liquid passes through strainer 24b, pipe 29, valve 26 and through pipe 29a to drain; the remainder of the liquid then flowing downwardly through particulate bed 13b into collector 15b, through pipe 43, through valve 44 where it discharges to waste.

At the conclusion of the allotted time for the flow described above, cam D opens switch 103, closing valves 62 and 44. Simultaneously, cam E permits switch 110 to close, coil 112 is energized, and solenoid valve 113 permits actuating fluid from pipe 95 to pass through pipe 114 opening valves 56 and 41. Untreated liquid now flows from pipe 50, through valve 51, pipe 55, through valves 56 and 85, pipe 57, into and through jet manifold 16b, flows rapidly upwardly in chamber 12b lifting the relatively light resin beads of 12b in a vigorous turbulent flow that carries the resin beads through passageway 12c where some of the liquid passes through strainer 24b, pipe 29, valve 26, and to drain through pipe 29a; the remainder of the liquid then flowing downwardly through particulate bed 13a into collector 15a, through pipe 32a, through valve 41 where it discharges to waste. As cams D and E rotate and their switches 103 and 110 respectively alternate in opening and closing the paired valves 62 and 44, and 56 and 41 respectively, backwash liquid now flows through the beds in reversals in accordance with the revolutions of the cams. The relative timing of the valve actuation may for example be that shown in the chart of FIG. 13.

Since regeneration periods may, generally, fall between one hour or two and one-half hours, and since backwash flow cycle reversals may be desired for periods of only a minute or two, the use of two cam program controllers is necessary for flexibility in the selection of the most suitable cam rotational speeds for the two separate requirements; hence, the use of primary cam controller 3 for the regeneration cycle, and the use of secondary cam controller 4 for reversals of backwash liquid flow.

The purpose of hand control valve 64 in pipe 63, and hand control valve 68 in pipe 61a is to permit of rapid backwash liquid flow through diffuser 15a in order to loosen any foreign substances that might be adhering to the bed of particulate material 13a. The procedure is to open valve 68 and to close valve 64 partially or totally to divert the flow of backwash liquid through diffuser 15a instead of through the jet manifold 16a. Likewise, the purpose of hand control valve 85 in pipe 57 and hand control valve 27 in pipe 55a is to loosen bed 13b in the same manner.

Since the regenerating action is not particularly related to the present invention, only one form is shown for all views; that of flow of regeneration solution upwardly in both chambers simultaneously. It is understood that any of the other means, such as downflow in both chambers simultaneously, or flow upwardly in one chamber and downwardly in the other may be used. In addition, the use of external pumping means, such as electric motor driven pumps instead of the simple eductor shown may be used in the various methods of flow mentioned.

At the end of the backwash part of the cycle, cam switch 87 opens, deenergizing motor 96, cam switches 103 and 110 and solenoid valves 106 and 113, thereby venting the fluid pressure in diaphragm valves 62, 44, 56, and 41, permitting them to return to their normally closed positions. Simultaneously, the contacts of cam switch 98 close permitting current to flow from line 80, through contacts 98, through line 99, through coil 100 of solenoid valve 101, to power line 81. Actuating fluid flows from 95 through valve 101, through pipe 102 to both diaphragm valves 69 and 73, opening these valves. Untreated liquid from pipe 30 now passes through junction fitting 31, through pipe 50, through valve 51, pipe 55 and pipe 61, through pipe 61b, through hand operated flow control valve 65, through pipe 66 and through eductor 67. A suction (lower pressure) on the liquid in pipe 71 created by the action of the eductor, permits atmospheric pressure on liquid regeneration solution 78 in tank 74, to force this solution through controller 75, up through pipe 71, through diaphragm valve 73, through hand operated flow control valve 72, through pipe 71, into eductor 67. From the discharge end of eductor 67, the mixture of liquid from pipe 66 and the solution from pipe 71 flows through diaphragm valve 69, down through pipe 36, through fitting 36a, the flow dividing at 36b, a portion passing through diffuser 15a by way of pipe 37a, check valve 37, and pipe 32a; the other portion passing through 15b by way of check valve 36c, fitting 36d and pipe 43. The regenerating solution then flows upwardly through ion exchange resin bed 14 in chambers 12a and 12b, into and through collector 24b, through pipe 29, through normally closed diaphragm valve 26 to drain by way of pipe 29a.

The slow rinse is included as a part of the regeneration operation since there is no change in the positions of the automatic time switch, automatic cam program controller, or in the positions of the three-way solenoid valves or the fluid pressure actuated diaphragm valves until the slow rinse is completed. The slow rinse is merely continued liquid flow through eductor 67 from pipe 66 and through the resin beds as described in the regeneration operation, but the flow of regenerating solution from tank 74 is shut off. The volume of solution that passes from tank 74 through pipe 71 during regeneration is controlled in various ways such as the float ball arrangement as shown. When float ball 79 in vertical movement, seats in control device 75, flow of solution 78 to pipe 71 is stopped. The distance the float ball 79 is permited to travel determines the volume of the solution that is used in the regeneration process.

At the termination of the slow rinse, contacts of switch 98 of cam B open, fluid pressure in pipe 102 is vented and diaphragm valves 73 and 69 close. At the same time switch 87 of cam C closes energizing motor 96 of cam program controller 4 to initiate operation of cams D and E and their switches 103 and 110, in order that diaphragm valves 62, 44, 56 and 41 repeat the operations as described under "backwash." This second performance of the backwash operation is needed to wash the resin and particulate supporting beds of any remaining solution that may have not been rinsed out during the slow rinse operation.

At the conclusion of this rapid backwash operation, the ion exchange resin is ready for the long exhaustion operation for useful supply of treated liquid. All controls are deenergized except the two coils 115 and 117 of the two two-way solenoid valves 116 and 118.

The embodiment partially shown in FIG. 2 is identical with that of FIG. 1 with the exception of the elimination of the backwashing manifolds 16a and 16b. The identifying numbers accorded to the elements of this embodiment are thus the same as those of the FIG. 1 embodiment with the addition of the prefix numeral 2. In the absence of the backwashing manifolds, untreated liquid for backwashing purposes is alternately introduced through diffuser-collectors 215a and 215b. Backwash flow through 215a is controlled by the valves 262 and 244, and backwash flow through 215b is controlled by the valves 256 and 241 in the identical manner of operation as in the FIG. 1 embodiment. Untreated liquid is supplied to 215a by way of valve 251, conduits 255 and 261, valve 262, conduits 261a and 232a; and untreated liquid is supplied to 215b by way of valve 251, conduit 255, valve 256 and conduits 255a and 243.

The liquid treating system shown in FIG. 3 is identical with that shown in FIG. 1 except for the fact that downflow exhaustion is employed, necessitating the connection of the untreated liquid conduit 32 to the collector-diffuser strainer 24b, and the connection of the treated liquid conduit 49 to conduits connecting with the collectors 15a and 15b in the bottom of the container. The downflow exhaustion differs from the upflow exhaustion only in the direction of liquid flow through the container and its components and beds of particulate and ion exchange resin beads. The untreated liquid is introduced into the top of chambers 12a and 12b through pipe 32, normally open valve 33, pipe 24 and diffuser 24b. The liquid, divided by partition 11 passes down through resin bed 14 in chambers 12a and 12b simultaneously, through beds 13a and 13b, through collectors 15a and 15b and merges at fitting 119a after passing through pipes 32a, normally open diaphragm valve 23, pipe 119, pipe 43, 121, hand control valve 120 and pipe 121a. From fitting 119a the treated liquid passes through normally open valve 48 to use by way of pipe 49. The valves 51, 53, 56, 59 and 62 and associated conduits which provide the noncontamination safeguard are identical in structure and operation with those described above with respect to the embodiment of FIG. 1.

In FIG. 4, a downflow system of the type shown in FIG. 3 is partially illustrated, this embodiment in a manner similar to that of FIG. 2 eliminating the backwashing manifolds as is clearly illustrated. Corresponding parts bear the same identifying numerals as in FIGS. 1 and 3 with the addition of the prefix 7.

The non-contamination arrangement of FIG. 4 is slightly different than that of the FIG. 3 embodiment. Pipe 750 branches into pipes 750a and 750b which respectively serve as the backwash and by-pass conduits. The pipes between valves 751, 756 and 762 in the backwash section are vented by valve 759, while the pipe between valves 751a and 753 in the by-pass conduit is vented by valve 759a. Valve 748 in FIG. 4 is shown in line 721, in the location occupied in FIG. 3 by the valve 120, the function of the valve remaining the same.

In FIG. 5 an optical arrangement of the liquid treating container of the embodiment of FIG. 1 is shown wherein instead of a single container 1 having compartments divided by the partition 11, a pair of tanks 5a, and 5b are utilized connected at their upper ends by a conduit forming the passage 512c and enclosing collector-diffuser 524b. The operation of this type of unit is in all respects the same as that of the embodiment of FIG. 1 and it will be noted that the corresponding parts bear the same identifying numerals with the addition of the prefix numeral 5.

Figure 6:
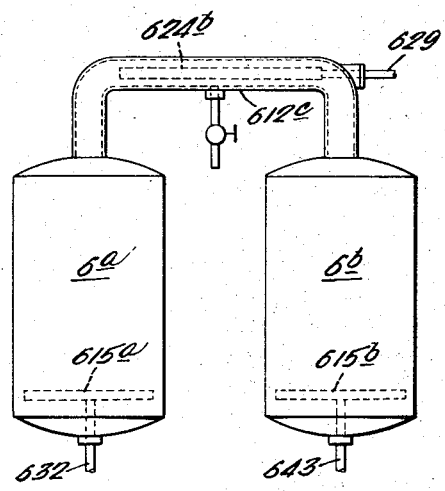
FIG. 6 is a view of apparatus similar to that of FIG. 5 but without the backwashing jets.

In FIG. 6 a pair of tanks 6a and 6b are illustrated similar to those of the FIG. 5 embodiment except for the elimination of the backwashing manifolds. The container arrangement of FIG. 6 is thus adapted for use in place of the container 2 of the FIG. 2 embodiment.

In liquid treating systems which employ two distinct treating units of the type described above, one unit can be operated in its regenerating cycle while the other unit is engaged in the normal exhausting flow, thus providing a continuous source of treated liquid. There is accordingly in such an installation no need for a by-pass of untreated liquid into the treated liquid conduit. Such installations are schematically illustrated in FIGS. 11 and 12, FIG. 12 differing from FIG. 11 only in that the FIG. 12 embodiment does not include backwashing manifolds. The corresponding parts of the embodiments of FIGS. 11 and 12 are accorded the same identifying numerals as used in the embodiments of FIGS. 1 and 3 with the addition of the prefix numeral 3 in the case of FIG. 11 and 4 in the case of FIG. 12.

In the absence of a by-pass conduit, the non-contamination arrangement includes the valves 351, 356, 359 and 362, the valves 351, 356 and 362 being normally closed while the valve 359 is normally open as was the case with the embodiment including the by-pass conduit. The valve 359 thus serves to vent the conduit between valve 351, 356 and 362 to prevent passage therethrough of untreated liquid. The same holds true of the valves 451, 456, 459 and 462 of the embodiment of FIG. 12.

The non-contamination arrangement shown in FIGS. 11 and 12 is only required in a downflow exhaustion system with the backwashing cow introduced at the bottom of the container compartments. This is due to the fact that the untreated liquid is introduced into the region from which the treated liquid is withdrawn in a downflow system and any leakage will result in a direct contamination of the treated liquid. In an upflow system, on the other hand, if the backwashing liquid is introduced at the bottom of the container compartments, leakage will have no effect on the treated liquid since the leakage would be into a region of the container into which untreated liquid is introduced.

Although the non-contamination features of the invention have been illustrated and described with respect to a two-chamber container or a two container system, it will be obvious that the invention is also applicable to the widely used single chamber type system. The non-contamination piping arrangement for a single chamber system will be the same as that illustrated and described herein except there will be only one backwash pipe leading into the container, whereas in the illustrated systems there is a backwash pipe for each chamber.

It can accordingly be understood that the present invention for elimination of contamination in liquid treating system may be applied either to prevent contamination leakage through a by-pass conduit alone, a backwashing conduit alone, or a combination of backwashing and by-pass conduits. The present arrangement is relatively simple and economical and may be readily applied to existing liquid treating units.

I claim:

1. In a liquid treating apparatus wherein an untreated liquid conduit leading into the apparatus is connected by a by-pass conduit to a treated liquid leading from the apparatus to permit a selective by-pass flow directly from the untreated liquid conduit to the treated liquid conduit, the improvement of means for closing said by-pass conduit and preventing passage of untreated liquid through the by-pass conduit into the treated liquid conduit when the by-pass conduit is closed, said means comprising spaced normally closed first and second valves in the by-pass conduit and means for selectively venting the by-pass conduit between said first and second valves, said latter means when said by-pass is closed by said first and second valves preventing pressure buildup in said by-pass conduit between said first and second valves, thus preventing passage of untreated liquid through said first and second valves into said treated liquid conduit.

2. The improvement as claimed in claim 1 wherein said means for selectively venting the by-pass conduit comprises a pressure relief conduit opening into said by-pass conduit between said valves, and a normally open valve in said pressure relief conduit.

3. The improvement as claimed in claim 1 wherein said first and second valves are normally maintained in the closed position by conduit fluid pressure, said first valve being held closed by untreated liquid pressure upstream thereof, and said second valve being held closed by treated liquid pressure downstream thereof.

4. In a liquid treating apparatus wherein an untreated liquid conduit leading into the apparatus is connected to a supplemental conduit leading into a treated liquid region of the apparatus for selective introduction of untreated liquid thereinto, the improvement of means for closing said supplemental conduit and preventing passage of untreated liquid therethrough when closed, said means comprising spaced normally closed first and second valves in said supplemental conduit, and means for selectively venting the supplemental conduit between said first and second valves, said latter means when said supplemental conduit is closed by said first and second valves preventing pressure buildup in said supplemental conduit between said first and second valves thus preventing passage of untreated liquid through said first and second valves into the treated liquid region of the apparatus.

5. The improvement as claimed in claim 4 wherein said means for selectively venting the supplemental conduit comprises a pressure relief conduit opening into said supplemental conduit between said valves, and a normally open valve in said pressure relief conduit.

6. The improvement as claimed in claim 4 wherein said first and second valves are normally maintained in the closed position by conduit fluid pressure, said first valve being held closed by untreated liquid pressure upstream thereof, and said second valve being held closed by treated liquid pressure downstream thereof.

7. In a liquid treating apparatus wherein an untreated liquid conduit leading into the apparatus is connected by a by-pass conduit to a treated liquid conduit leading from the apparatus to permit a selective by-pass flow directly from the untreated liquid conduit to the treated liquid conduit, and wherein said untreated liquid conduit is also connected to a supplemental conduit leading into a treated liquid region of the apparatus for selective introduction of untreated liquid thereinto, the improvement of means for selectively closing said by-pass conduit and said supplemental conduit and preventing passage of untreated liquid therethrough when closed, said means comprising a first valve in the untreated liquid conduit leading to said supplemental conduit and said by-pass conduit, a second valve in said by-pass conduit, a third valve in said supplemental conduit, and means for selectively venting the conduits between said first, second and third valves, the closing of said first, second and third valves and the opening of said venting means preventing pressure buildup in the conduit between said valves thus preventing passage of untreated liquid therethrough.

8. Liquid treating apparatus including a container defining a liquid treating chamber, a bed of particulate material in said chamber, an untreated liquid conduit communicating with said chamber above said bed of particulate material, a treated liquid conduit communicating with said container beneath said bed of particulate material, a supplemental conduit connecting said untreated liquid conduit with said container, said supplemental conduit communicating with said container beneath said bed of particulate material, spaced normally closed first and second valves in said supplemental conduit, and means for selectively venting the supplemental conduit between said valves, the venting of said conduit when closed by said valves preventing pressure buildup therein and passage of untreated liquid into the container.

9. Liquid treating apparatus as claimed in claim 8 including a by-pass conduit communicating with said supplemental conduit between said valves and connected with said treated liquid conduit, and a normally closed valve in said by-pass conduit.

10. A liquid treating apparatus comprising container means providing a pair of liquid treatment chambers, each chamber containing a liquid treatment bed of particulate material, means forming a communicating passage between the chambers above the material beds permitting movement of liquid and particulate material therebetween, an untreated liquid conduit communicating with each of said chambers above said beds of material, a treated liquid conduit communicating with each of said chambers below said beds of material, supplemental conduit means connecting said untreated liquid conduit with each of said chambers below said material beds, spaced normally closed valves in said supplemental conduit means, and means for selectively venting the supplemental conduit means between said valves, the venting of said conduit means when closed by said valves preventing pressure buildup therein and passage of untreated liquid into the container chambers.

11. A liquid treating apparatus as claimed in claim 10 including a by-pass conduit communicating with said supplemental conduit means between said valves and connected with said treated liquid conduit, and a normally closed valve in said by-pass conduit.

References Cited

UNITED STATES PATENTS 1,980,161  11/1934  Applebaum _____ 210—275 X

REUBEN FRIEDMAN, Primary Examiner

F. A. SPEAR, JR., Assistant Examiner

U.S. Cl. X.R.

210—134, 189, 275